United States Patent
Liu et al.

(10) Patent No.: US 12,314,708 B2
(45) Date of Patent: May 27, 2025

(54) IMAGE CONFIGURATION METHOD, DEVICE AND SYSTEM, AND STORAGE MEDIUM

(71) Applicants: BEIJING WODONG TIANJUN INFORMATION TECHNOLOGY CO., LTD., Beijing (CN); BEIJING JINGDONG CENTURY TRADING CO., LTD., Beijing (CN)

(72) Inventors: Yujiao Liu, Beijing (CN); Ming Gao, Beijing (CN)

(73) Assignees: BEIJING WODONG TIANJUN INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 231 days.

(21) Appl. No.: 18/040,391

(22) PCT Filed: May 21, 2021

(86) PCT No.: PCT/CN2021/095037
§ 371 (c)(1),
(2) Date: Feb. 2, 2023

(87) PCT Pub. No.: WO2022/028046
PCT Pub. Date: Feb. 10, 2022

(65) Prior Publication Data
US 2023/0289178 A1 Sep. 14, 2023

(30) Foreign Application Priority Data
Aug. 3, 2020 (CN) .......................... 202010768208.3

(51) Int. Cl.
*G06F 8/71* (2018.01)
*G06T 11/60* (2006.01)

(52) U.S. Cl.
CPC ................ *G06F 8/71* (2013.01); *G06T 11/60* (2013.01)

(58) Field of Classification Search
None
See application file for complete search history.

(56) References Cited

U.S. PATENT DOCUMENTS

2009/0322788 A1* 12/2009 Sawano ................. H04N 1/387
　　　　　　　　　　　　　　　　　　　　　　463/31
2010/0029303 A1* 2/2010 Lim ......................... H04L 67/04
　　　　　　　　　　　　　　　　　　　　　　455/574

(Continued)

FOREIGN PATENT DOCUMENTS

| CN | 102129378 A | 7/2011 |
| CN | 102143128 A | 8/2011 |

(Continued)

OTHER PUBLICATIONS

Extended European Search Report corresponding to EP 21854396.5; Date Jul. 4, 2024, (11 pages).

(Continued)

*Primary Examiner* — Yi Wang
(74) *Attorney, Agent, or Firm* — Myers Bigel, P.A.

(57) ABSTRACT

The present disclosure discloses an image configuration method, device and system, and a storage medium, relating to the technical field of terminal applications. The image configuration method includes: downloading an image configuration table, wherein the image configuration table includes identifiers of images to be adjusted in a terminal application, and links of the images at a server; in response to detecting, via monitoring, a request to load an image, detecting whether or not an identifier of the requested image is present in the image configuration table; and if so, downloading, according to the identifiers of the images and the links of the images at the server in the image configu- (Continued)

ration table, an adjustment image from the server, and loading the adjustment image.

17 Claims, 4 Drawing Sheets

(56) References Cited

U.S. PATENT DOCUMENTS

2019/0098063 A1* 3/2019 Green ................. G06Q 20/342
2020/0320154 A1 10/2020 Han et al.

FOREIGN PATENT DOCUMENTS

| | | | | |
|---|---|---|---|---|
| CN | 103269452 | A | 8/2013 | |
| CN | 104253836 | A | 12/2014 | |
| CN | 105760405 | A | 7/2016 | |
| CN | 106227512 | A | 12/2016 | |
| CN | 107301051 | A | 10/2017 | |
| CN | 107463613 | A | 12/2017 | |
| CN | 107832784 | A * | 3/2018 | ........... G06K 9/6267 |
| CN | 108256006 | A | 7/2018 | |
| CN | 108932277 | A | 12/2018 | |
| CN | 109857966 | A | 6/2019 | |
| CN | 110413911 | A | 11/2019 | |
| CN | 110809036 | A | 2/2020 | |
| EP | 3147780 | A1 | 3/2017 | |

OTHER PUBLICATIONS

International Search Report and Written Opinion corresponding to PCT/CN2021/095037; Mailed Aug. 13, 2021, (12 pages, including English translation).
First Chinese Office Action corresponding to CN 202010768208.3; Dated Aug. 22, 2022, (24 pages, including English translation).

* cited by examiner

IMAGE CONFIGURATION METHOD, DEVICE AND SYSTEM, AND STORAGE MEDIUM

CROSS-REFERENCE TO RELATED APPLICATIONS

This application is a U.S. National Stage Application under 35 U.S.C. § 371 of International Patent Application No. PCT/CN2021/095037, filed May 21, 2021, which itself is based on and claims priority to Chinese patent application No. 202010768208.3 filed on Aug. 3, 2020, the disclosures of both of which are hereby incorporated in its their entireties into the present application.

TECHNICAL FIELD

This disclosure relates to the field of app technologies, and in particular, to an image configuration method, device and system, and a storage medium.

BACKGROUND

In a terminal application (App), a page is often rendered using many images, which can be downloaded from a server when displayed or pre-packaged inside the App. For each position where an image is displayed, a developer is often required to consider a manner of acquiring the image from the position, when writing application code.

If an image sent by the server is used, the use of a placeholder image needs to be considered, so that the placeholder image can be placed after a loading failure. Moreover, in the writing code stage, resources such as fields and interfaces need to be customized for the position. But if a local image packaged inside the terminal application is used, when the image needs to be changed, client version upgrade has to be relied on.

SUMMARY

According to a first aspect of some embodiments of the present disclosure, there is provided an image configuration method, comprising: downloading an image configuration table, wherein the image configuration table comprises an identification of an image to be adjusted in a terminal application and a link of the image to be adjusted at a server; in response to monitoring a request for loading an image, detecting whether there is an identification of the image requested for loading in the image configuration table; and in case that there is the identification of the image requested for loading in the image configuration table, downloading from the server and loading the image to be adjusted corresponding to the identification of the image in the image configuration table and the link of the image at the server.

In some embodiments, in case that there is the identification of the image requested for loading in the image configuration table, a method for loading an image locally in an image loading module of the terminal application is replaced with a method for loading an image from a server, wherein a parameter of the method for loading an image from a server comprises the identification of the image requested for loading and the link thereof at the server.

In some embodiments, the method for loading an image locally in the image loading module is replaced with the method for loading an image from a server, through a runtime method swizzle mechanism.

In some embodiments, the terminal application has local configuration information comprising an identification and version information of a locally stored image, and the image configuration table comprises version information of the image to be adjusted; and in case that the image configuration table comprises the identification of the image requested for loading and a version corresponding to the identification in the image configuration table is higher than a version corresponding to the identification in the local configuration information, the image to be adjusted corresponding to the identification of the image in the image configuration table and the link of the image at the server is downloaded from the server and loaded.

In some embodiments, the image configuration method further comprising: storing the image to be adjusted corresponding to the identification of the image in the image configuration table and the link of the image at the server into a buffer image path; and updating the version information in the local configuration information.

In some embodiments, in the method for loading an image locally, the image is read from the buffer image path first, and in case that the image cannot be read from the buffer image path, the image is read from an original image path.

In some embodiments, the image configuration method further comprising: downloading a clearing configuration table, wherein the clearing configuration table comprises an identification of an image to be cleared in the terminal application; and deleting, from the local buffer image path, an image with the identification in the clearing configuration table.

In some embodiments, the image configuration table is in a form of a key-value pair, and a key in the image configuration table is the identification of the image.

In some embodiments, the image configuration table is downloaded in response to a start of the terminal application.

According to a second aspect of some embodiments of the present disclosure, there is provided an image configuration device, comprising: an image configuration table downloading module configured to download an image configuration table, wherein the image configuration table comprises an identification of an image to be adjusted in a terminal application and a link of the image to be adjusted at a server; an identification detection module configured to, in response to monitoring a request for loading an image, detect whether there is an identification of the image requested for loading in the image configuration table; and a server image loading module configured to, in case that the image configuration table comprises the identification of the image requested for loading, download from the server and load the image to be adjusted corresponding to the identification of the image in the image configuration table and the link of the image at the server.

According to a third aspect of some embodiments of the present disclosure, there is provided an image configuration device, comprising: a memory; and a processor coupled to the memory, the processor being configured to perform, based on instructions stored in the memory, any of the above image configuration methods.

According to a fourth aspect of some embodiments of the present disclosure, there is provided an image configuration system, comprising: a terminal application module comprising any of the above image configuration devices; and a server module configured to send an image configuration table to the terminal application module.

According to a fifth aspect of some embodiments of the present disclosure, there is provided a non-transitory computer-readable storage medium having a computer program stored thereon, wherein the program, when executed by a processor, implements any of the above image configuration methods.

Some embodiments in the above disclosure have the following advantages or benefits: in the embodiments of the present disclosure, notifying the terminal application of the image that needs to be updated by using the image configuration table. When an image involved in the image configuration table is loaded, the image can be dynamically downloaded from the server. Therefore, when the image is updated, the terminal application can more efficiently load the latest image, which saves costs of sending fields and interfacing resources at the server, as well as releasing and updating a version of the terminal application, realizes dynamic configuration of the image loading manner, and improves flexibility of the image configuration in the terminal application. Moreover, the execution process of downloading and detecting the image configuration table is shorter, which has little effect on the user experience.

Other features of the present disclosure and advantages thereof will become apparent from the following detailed description of exemplary embodiments thereof, which proceeds with reference to the accompanying drawings.

BRIEF DESCRIPTION OF THE DRAWINGS

In order to more clearly illustrate embodiments of the present disclosure or technical solutions in the prior art, the drawings that need to be used in the description of the embodiments or the prior art will be briefly described below, it is obvious that the drawings in the following description are only some embodiments of the present disclosure, and for one of ordinary skill in the art, other drawings can be also obtained according to the drawings without paying out creative efforts.

DETAILED DESCRIPTION

Figure 1:
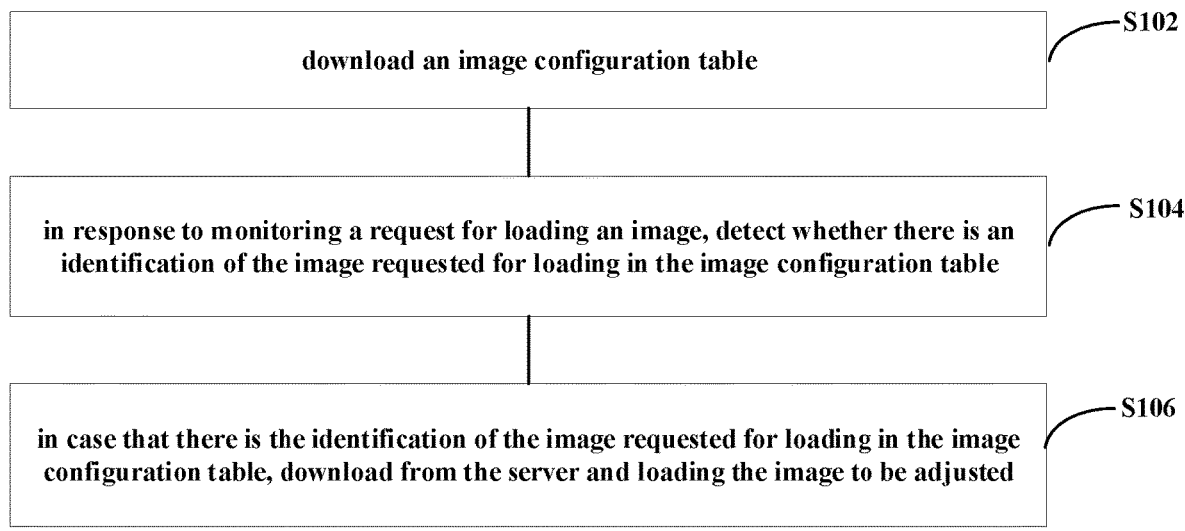
FIG. 1 shows a flow diagram of an image configuration method according to some embodiments of the present disclosure.

The technical solutions in the embodiments of the present disclosure will be described clearly and completely in combination with the drawings in the embodiments of the present disclosure, and it is obvious that the embodiments described are only some of the embodiments of the present disclosure, rather than all of them. The following description of at least one exemplary embodiment is merely illustrative in nature and is in no way intended to limit this disclosure and its application or use. Based on the embodiments in the present disclosure, all other embodiments, which are obtained by one of ordinary skill in the art without making creative efforts, fall within the protection scope of the present disclosure.

The relative arrangement, numerical expressions, and numerical values of components and steps set forth in these embodiments do not limit the scope of the present disclosure unless specifically stated otherwise.

Meanwhile, it should be understood that a size of each portion shown in the drawings is not drawn to an actual scale for ease of description.

A technique, method, and device known to one of ordinary skill in the related art may not be discussed in detail but are intended to be part of the granted specification where appropriate.

In all examples shown and discussed herein, any specific value should be construed as exemplary only and not as limiting. Thus, another example of an exemplary embodiment can have a different value.

It should be noted that: similar reference numbers and letters refer to similar items in the following drawings, and thus, once a certain item is defined in one drawing, it does not need to be discussed further in subsequent drawings.

After analysis, inventors have found that if images are abundantly sent from the server, a large amount of traffic of a user will be consumed. Moreover, if network environment is poor, user experience is also poor. In the related art, therefore, developers will package many images inside an App.

However, in many cases, developers consider that some images will not be modified in a development stage, but after the App is online, one or more rendering modifications need to be made to some images due to some special business requirements. Thus, each modification needs a version release update at a client. A process of the version release update needs to take some time, and a user also needs to update the App at a terminal. Therefore, if the image is modified frequently, the user experience will also be affected.

Therefore, the solutions of the related art are not flexible enough and may affect the use experience of the user.

One technical problem to be solved by the embodiments of the present disclosure is how to improve flexibility of image configuration in the terminal application and reduce an influence on the use experience of the user.

FIG. 1 shows a flow diagram of an image configuration method according to some embodiments of the present disclosure. As shown in FIG. 1, the image configuration method for a terminal application in this embodiment comprises steps S102 to S106.

In the step S102, an image configuration table is downloaded, wherein the image configuration table comprises an identification of an image to be adjusted in the terminal application and a link of each image to be adjusted at a server. The identification of the image is, for example, an image name.

In some embodiments, the image configuration table is generated and sent by the server of the terminal application, and the image corresponding to the information in the image configuration table is an updated version of an image which is pre-packaged in the terminal application when the terminal application is released. Therefore, when an image that is planned to be displayed in a local loading manner is changed, dynamic configuration can be realized through the image configuration table.

In some embodiments, the image configuration table is downloaded in response to a start of the terminal application.

Therefore, in a process of a user using the terminal application, when the image needs to be loaded, a loading path can be quickly determined based on the already downloaded image configuration table, so that efficiency of the image loading is improved.

In some embodiments, the image configuration table is in a form of a key-value pair, and a key in the image configuration table is the identification of the image.

In some embodiments, when the terminal application is an application in an iOS operating system, the image configuration table is, for example, a file in a plist format, wherein the identification and the link of the image are stored in a key-value manner.

In the step S104, in response to monitoring a request for loading an image, it is detected whether there is an identification of the image requested for loading in the image configuration table.

In some embodiments, in response to monitoring an execution request for a method for loading an image locally, it is detected whether there is the identification of the image requested for loading in the image configuration table. The "method" herein refers to a named subprogram used in programming, which is composed of some code.

The method for loading an image locally refers to a method for reading, through a local path, locally stored images for display, wherein the images are often packaged in the terminal application when the terminal application is released.

In some embodiments, for the iOS system, methods related to the loading an image locally, such as imageWithNamed, imageNamed, imageWithContentsOfFile, imageWithData, etc. of UIImageView are monitored. Parameters of these methods comprise the identification of the image. Therefore, when the request for loading the image is monitored, the identification of the loaded image can be acquired.

In some embodiments, the method for loading an image locally is monitored by means of hook.

In the step S106, in case that the image configuration table comprises the identification of the image requested for loading, it is indicated that the server indicates that the image needs to be updated. At this time, the image to be adjusted corresponding to the identification of the image in the image configuration table and the link of the image at the server, i.e., the image requested for loading, is downloaded from the server and loaded. Therefore, an image of a latest version of the server can be obtained.

In some embodiments, the terminal application has already preset modules that execute according to certain call logic, such as some methods, functions or sentences. For example, the terminal application can, when released, implement an image loading module by using the method for loading an image locally. When the image configuration table comprises the identification of the image requested for loading, the method for loading an image locally in the image loading module is replaced with a method for loading an image from a server, wherein a parameter of the method for loading an image from a server comprises the identification of the image to be adjusted corresponding to the identification of the image in the image configuration table and the link of the image at the server and the link of the image at the server, i.e., the identification of the image requested for loading and the link thereof at the server. Therefore, the terminal application bypasses the original local loading manner in the running process, but uses the server loading manner instead.

In this way, the conventional processing flow of the terminal application can still use the local loading logic, and only when the dynamic configuration is needed, it is replaced with the server loading logic. And in case that the image configuration table does not comprise the identification of the image requested for loading, the image is loaded still by using the local loading method inherent in the terminal.

In some embodiments, the above method replacement can be realized through a runtime method swizzle mechanism. Runtime method swizzle is a mechanism in the iOS system, in which a call flow of a method can be modified by dynamically changing a correspondence between a method number and method implementation. For example, a correspondence between a method implementation of loading locally and a method number can be modified to a correspondence between a method implementation of loading at the server and the same method number, so that main logic of the terminal application can still be implemented in the manner of loading an image locally, and only a runtime method swizzle module is added to implement the dynamic configuration of the image.

In the above embodiment, the terminal application is notified of the image that needs to be updated by using the image configuration table. When an image involved in the image configuration table is loaded, the image can be dynamically downloaded from the server. Therefore, when the image is updated, the terminal application can more efficiently load the latest image, which saves costs of sending fields and interfacing resources of the server as well as releasing and updating a version of the terminal application, realizes the dynamic configuration of the image loading manner, and improves flexibility of the image configuration in the terminal application. Moreover, the execution process of downloading and detecting the image configuration table is shorter, which has little effect on the user experience.

In some embodiments, in the terminal application, local configuration information can also be set, which comprises an identification and version information of a locally stored image. In addition, the downloaded image configuration table also comprises version information of the image to be adjusted. Comparison of the version information is performed before the method swizzle is performed. Some embodiments of the image configuration method of the present disclosure is described below with reference to FIG. 2.

Figure 2:
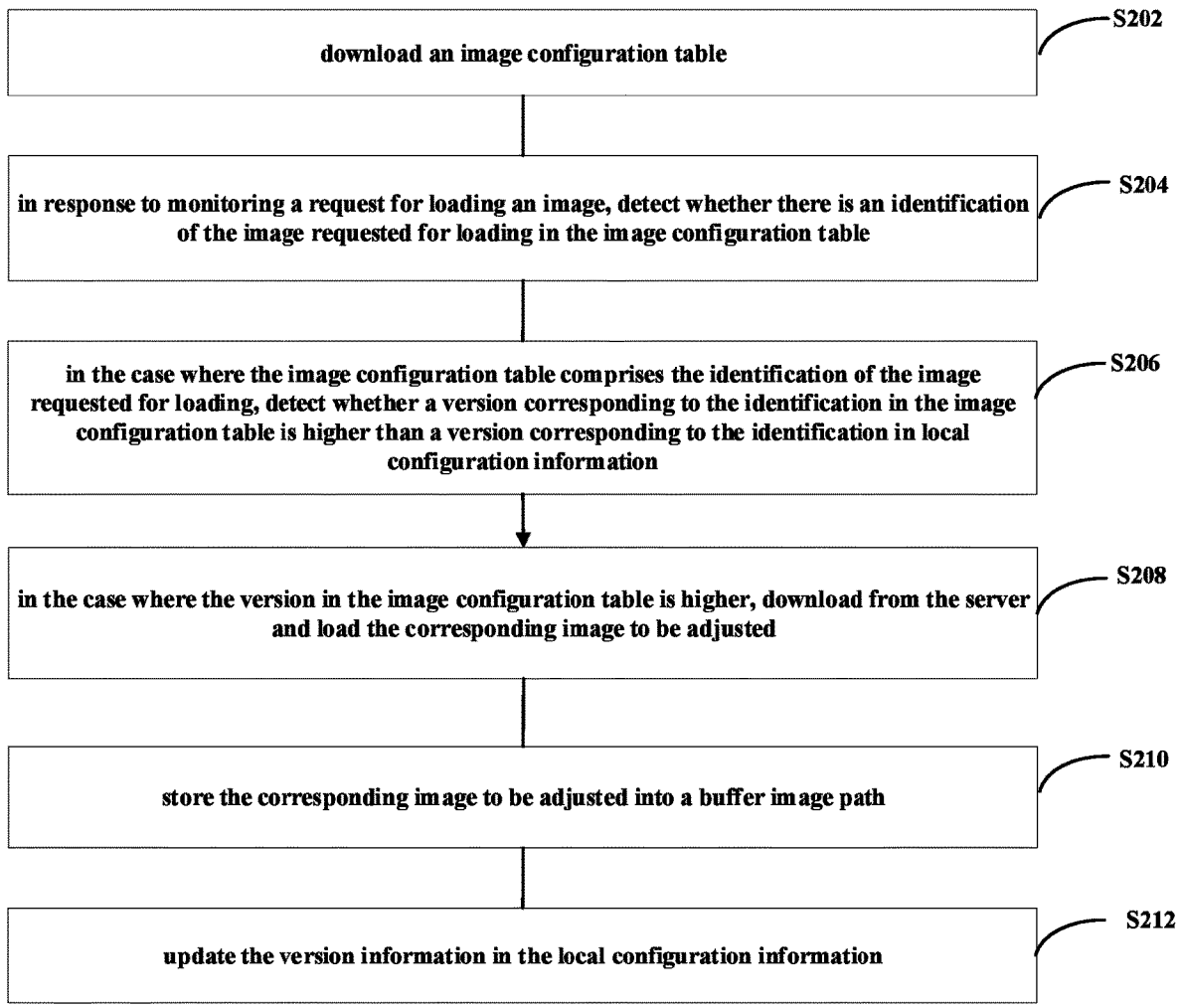
FIG. 2 shows a flow diagram of an image configuration method according to other embodiments of the present disclosure.

FIG. 2 shows a flow diagram of an image configuration method according to other embodiments of the present disclosure. As shown in FIG. 2, the image configuration method of this embodiment comprises steps S202 to S208.

In the step S202, an image configuration table is downloaded, wherein the image configuration table comprises an identification of an image to be adjusted in a terminal application and a link of the image at a server.

In the step S204, in response to monitoring a request for executing a method for loading an image locally, it is detected whether there is an identification of an image requested for loading in the image configuration table.

In the step S206, in case that the image configuration table comprises the identification of the image requested for loading, it is detected whether a version corresponding to the identification in the image configuration table is higher than a version corresponding to the identification in local configuration information. For example, when the version information is a version number, it is determined which side of the server and the terminal application has a higher version by comparing version numbers.

In some embodiments, the local configuration information is NSUserDefault (user default information), which is typically used for storing content to be buffered.

In the step S208, in case that the version in the image configuration table is higher, the image to be adjusted corresponding to the identification of the image in the image configuration table and the link of the image at the server, i.e., the image requested for loading, is downloaded from the server and loaded. For example, in case that the version in the image configuration table is higher, a method for loading an image locally in an image loading module is replaced with a method for loading an image from a server, through a runtime method swizzle mechanism.

And in case that the version in the local configuration information is higher, logic in an image loading module that is inherent in the terminal application is executed, such as the method of loading an image locally.

According to the method of the above embodiment, the update of the image is maintained by using the local configuration information, so that when the updated image has already been stored locally, it is determined whether the locally stored image is a latest version according to the comparison result of the version information, so as to determine whether the image is downloaded from the server or loaded locally. Therefore, loading efficiency and accuracy of the image are improved.

In some embodiments, the image configuration method of the embodiment further comprises steps S210 to S212.

In the step S210, the image to be adjusted corresponding to the identification of the image in the image configuration table and the link of the image at the server is stored into a buffer image path, that is, the image downloaded from the server is stored into the buffer image path. Accordingly, when it is found that there is an image of a latest version at the server, the image is buffered locally.

If an image with the same identification has already existed in the buffer image path, it is indicated that the image is an image of an old version, so that the image to be adjusted can be used to directly replace the image of the old version.

In the step S212, the version information in the local configuration information is updated.

In some embodiments, when there is not the identification of the image to be adjusted in the local configuration information, a correspondence between the identification corresponding to the image to be adjusted and the version information is newly added in the local configuration information. When there is the identification of the image to be adjusted in the local configuration information, the original version information corresponding to the identification is replaced with the version information of the image to be adjusted.

In some embodiments, in the local image loading method, the image is read from the buffer image path first, and in case that the image cannot be read from the buffer image path, the image is read from an original image path. The original image path is a storage path for the image when packaged into the terminal application.

For example, by comparing the versions of the identifications of the images to be loaded in the downloaded image configuration table and the local configuration information, if it is determined that the image of the latest version has already been buffered locally, at this time, the method of loading an image locally in the conventional business logic of the terminal application is still used without downloading from the server. However, by using the method of the embodiment, when there is the updated image in the buffer image path, it is tried to read the image from the path first, to load the image of the latest version.

In some embodiments, when it is needed to return the image back to the original version, the image in the buffer image path can also be deleted. Some embodiments of an image clearing method is described below with reference to FIG. 3.

Figure 3:
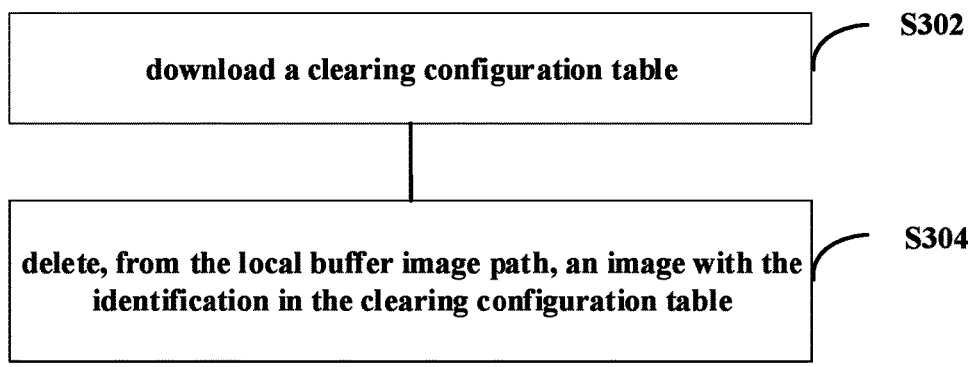
FIG. 3 shows a flow diagram of an image clearing method according to some embodiments of the present disclosure.

FIG. 3 shows a flow diagram of an image clearing method according to some embodiments of the present disclosure. As shown in FIG. 3, the image clearing method of this embodiment comprises steps S302 to S304.

In the step S302, a clearing configuration table is downloaded, wherein the clearing configuration table comprises an identification of an image to be cleared in the terminal application.

In the step S304, an image with the identification in the clearing configuration table is deleted from the local buffer image path.

In some embodiments, the record corresponding to the image with the identification in the clearing configuration table in the local configuration information can also be cleared.

For example, if an image at a certain position in a terminal application is temporarily upgraded during an activity, the terminal application can obtain a latest image from a server in a manner of sending an image configuration table. When the activity is finished and the image at the position needs to be restored to an original version, a stored image of a new version can be cleared in the manner of the embodiment of FIG. 3, so that the terminal application still loads the image from an original image path according to inherent logic. Therefore, in the embodiment of the present disclosure, the case of temporary adjustment for the image can be coped with, which improves flexibility of the image configuration.

Some embodiments of an image configuration device of the present disclosure is described below with reference to FIG. 4.

Figure 4:
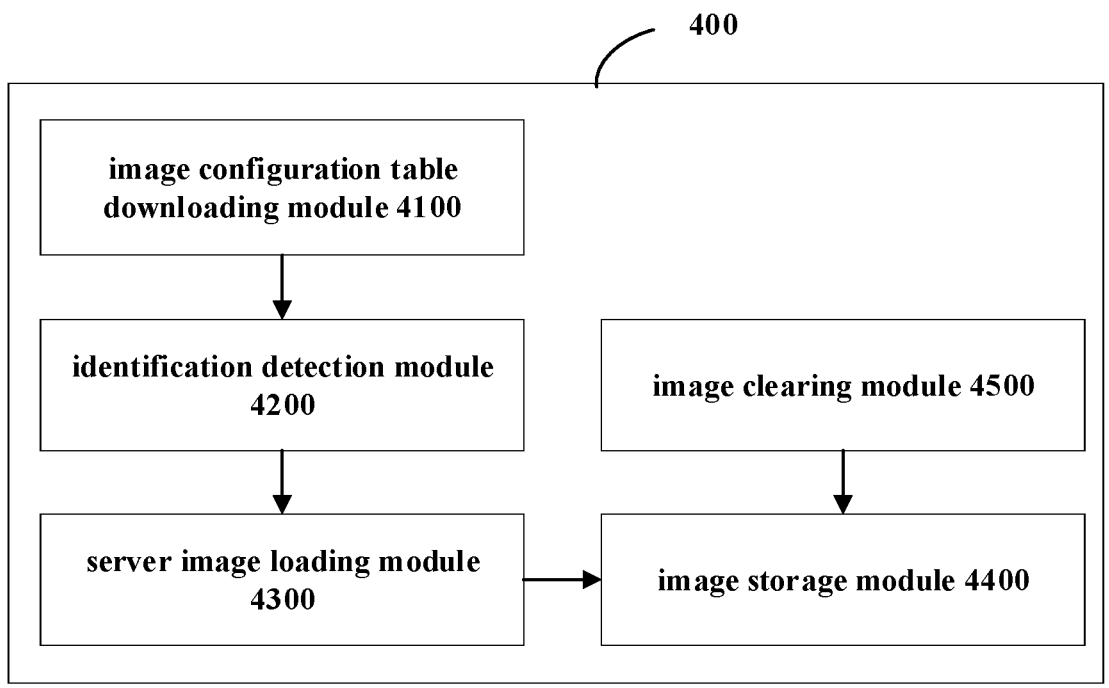
FIG. 4 shows a schematic structural diagram of an image configuration device according to some embodiments of the present disclosure.

FIG. 4 shows a schematic structural diagram of an image configuration device according to some embodiments of the present disclosure. As shown in FIG. 4, the image configuration device 400 of this embodiment comprises: an image configuration table downloading module 4100 configured to download an image configuration table, wherein the image configuration table comprises an identification of an image to be adjusted in a terminal application and a link of the image to be adjusted at a server; an identification detection module 4200 configured to, in response to monitoring a request for loading an image, detect whether there is an identification of the image requested for loading in the image configuration table; a server image loading module 4300 configured to, in case that the image configuration table comprises the identification of the image requested for loading, download from the server and load the image to be adjusted corresponding to the identification of the image in the image configuration table and the link of the image at the server.

In some embodiments, the server image loading module 4300 is further configured to, in case that the image configuration table comprises the identification of the image requested for loading, replace a method for loading an image locally in an image loading module of the terminal application with a method for loading an image from a server, wherein a parameter of the method for loading an image from a server comprises the identification of the image requested for loading and the link thereof at the server.

In some embodiments, the server image loading module 4300 is further configured to, through a runtime method swizzle mechanism, replace the method for loading an image locally in the image loading module with the method for loading an image from a server.

In some embodiments, the terminal application has local configuration information comprising an identification and version information of a locally stored image, and the image configuration table comprises version information of the image to be adjusted. The image configuration table comprises the identification of the image requested for loading and the server image loading module 4300 is further configured to a version corresponding to the identification in the image configuration table is higher than a version corresponding to the identification in the local configuration information, download from the server and load the image to be adjusted corresponding to the identification of the image in the image configuration table and the link of the image at the server.

In some embodiments, the image configuration device 400 further comprises: an image storage module 4400 configured to store the image to be adjusted corresponding to the identification of the image in the image configuration table and the link of the image at the server into a buffer image path; and update the version information in the local configuration information.

In some embodiments, in the method for loading an image locally, the image is read from the buffer image path first, and in case that the image cannot be read from the buffer image path, the image is read from an original image path.

In some embodiments, the image configuration device 400 further comprises: an image clearing module 4500 configured to download a clearing configuration table, wherein the clearing configuration table comprises an identification of an image to be cleared in the terminal application; and delete, from the local buffer image path, an image with the identification in the clearing configuration table.

In some embodiments, the image configuration table is in a form of a key-value pair, and a key in the image configuration table is the identification of the image.

In some embodiments, the image configuration table downloading module 4100 is further configured to, in response to a start of the terminal application, download the image configuration table.

Some embodiments of an image configuration system of the present disclosure is described below with reference to FIG. 5.

Figure 5:
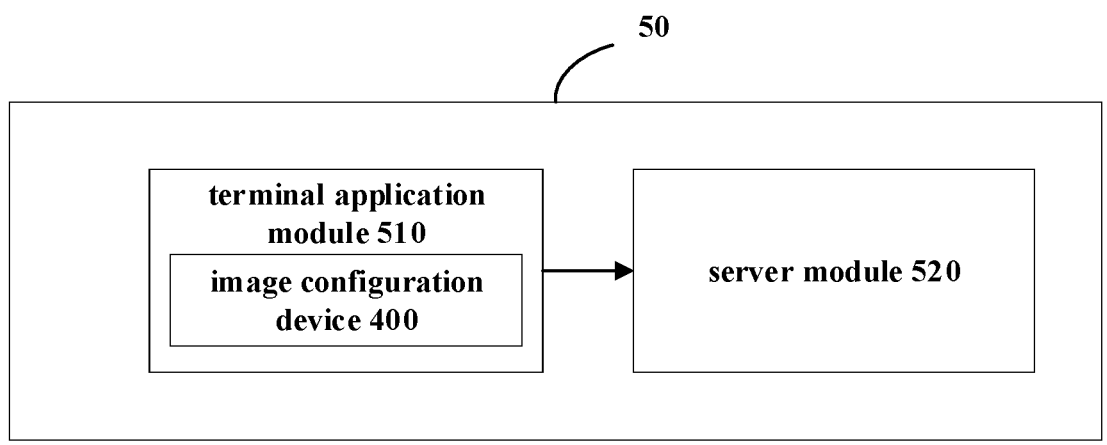
FIG. 5 shows a schematic structural diagram of an image configuration system according to some embodiments of the present disclosure.

FIG. 5 shows a schematic structural diagram of an image configuration system according to some embodiments of the present disclosure. As shown in FIG. 5, the image configuration system 50 of this embodiment comprises: a terminal application module 510, comprising any of the above image configuration devices 400; and a server module 520 configured to send an image configuration table to the terminal application module 510.

In some embodiments, the terminal application module 510 comprises the image configuration device 400 and a business logic unit which comprises main processing logic of a terminal application. Therefore, when the solution of the present disclosure is to be used, the business logic unit can implement the function of the dynamic configuration for the image by adding the image configuration device 400, without improvements.

Figure 6:
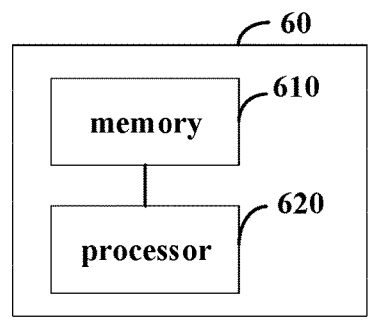
FIG. 6 shows a schematic structural diagram of an image configuration device according to other embodiments of the present disclosure.

FIG. 6 shows a schematic structural diagram of an image configuration device according to other embodiments of the present disclosure. As shown in FIG. 6, the image configuration device 60 of this embodiment comprises: a memory 610 and a processor 620 coupled to the memory 610, wherein the processor 620 is configured to perform, based on instructions stored in the memory 610, the image configuration method in any of the above embodiments.

The memory 610 can include, for example, a system memory, fixed non-volatile storage medium, and the like. The system memory has thereon stored, for example, an operating system, an application, a boot loader, other programs, and the like.

Figure 7:
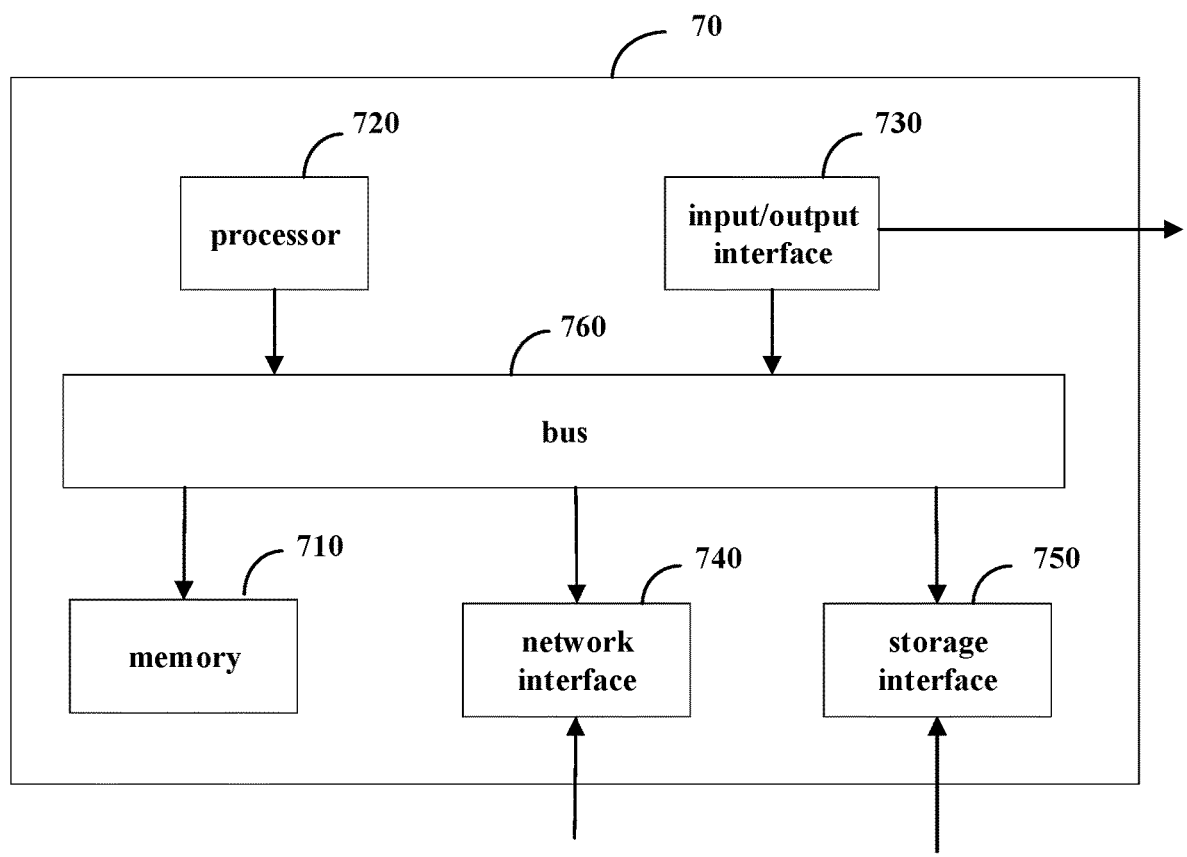
FIG. 7 shows a schematic structural diagram of an image configuration device according to still other embodiments of the present disclosure.

FIG. 7 shows a schematic structural diagram of an image configuration device according to still other embodiments of the present disclosure. As shown in FIG. 7, the image configuration device 70 of this embodiment comprises: a memory 710 and a processor 720, and can further comprise an input/output interface 730, a network interface 740, a storage interface 750, and the like. These interfaces 730, 740, 750, as well as the memory 710 and the processor 720, can be connected, for example, by a bus 760. The input/output interface 730 provides a connection interface for input/output devices such as a display, a mouse, a keyboard, and a touch screen. The network interface 740 provides a connection interface for various networking devices. The storage interface 750 provides a connection interface for external storage devices such as an SD card and a USB disk.

Some embodiments of the present disclosure further provides a computer-readable storage medium having thereon stored a computer program, characterized in that the program, when executed by a processor, implements any of the above image configuration methods.

It should be appreciated by those skilled in the art that, the embodiments of the present disclosure can be provided as a method, system, or computer program product. Accordingly, the present disclosure can take a form of an entire hardware embodiment, an entire software embodiment, or an embodiment combining software and hardware aspects. Furthermore, the present disclosure can take a form of a computer program product implemented on one or more computer-usable non-transitory storage media (including, but not limited to, a disk memory, CD-ROM, optical memory, etc.) having computer-usable program code embodied therein.

The present disclosure is described with reference to the flow diagrams and/or block diagrams of the method, device (system), and computer program product according to the embodiments of the present disclosure. It should be understood that each flow and/or block of the flow diagrams and/or block diagrams, and a combination of flows and/or blocks in the flow diagrams and/or block diagrams, can be implemented by computer program instructions. These computer program instructions can be provided to a processor of a general-purpose computer, special-purpose computer, embedded processor, or other programmable data processing devices to produce a machine, such that the instructions, which are executed by the processor of the computer or other programmable data processing devices, create means for implementing the function specified in one or more flows of the flow diagrams and/or one or more blocks of the block diagrams.

These computer program instructions can also be stored in a computer-readable memory that can guide a computer or other programmable data processing devices to work in a specific manner, such that the instructions stored in the computer-readable memory produce an article of manufacture including instruction means which implement the function specified in one or more flows of the flow diagrams and/or one or more blocks of the block diagrams.

These computer program instructions can also be loaded onto a computer or other programmable data processing devices to cause a series of operation steps to be performed on the computer or other programmable devices to produce a computer-implemented process, such that the instructions, which are executed on the computer or other programmable devices, provide steps for implementing the function specified in one or more flows of the flow diagrams and/or one or more blocks of the block diagrams.

The above description is only the preferred embodiments of the present disclosure and not used to limit the present disclosure, and any modification, equivalent replacement, improvement, etc., made within the spirit and principles of the present disclosure should be included in the protection scope of the present disclosure.

What is claimed is:

1. An image configuration method, comprising:
   downloading an image configuration table, wherein the image configuration table comprises an identification of an image to be adjusted in a terminal application and a link of the image to be adjusted at a server;
   in response to monitoring a request for loading an image, detecting whether there is an identification of the image requested for loading in the image configuration table; and
   in case that there is the identification of the image requested for loading in the image configuration table, downloading from the server and loading the image to be adjusted corresponding to the identification of the image in the image configuration table and the link of the image at the server, wherein in case that there is the identification of the image requested for loading in the image configuration table, a method for loading an image locally in an image loading module of the terminal application is replaced with a method for loading an image from a server, wherein a parameter of the method for loading an image from a server comprises the identification of the image requested for loading and the link thereof at the server, and the method for loading an image locally in the image loading module is replaced with the method for loading an image from a server, through a runtime method swizzle mechanism.

2. The image configuration method according to claim 1, wherein:
   the terminal application has local configuration information comprising an identification and version information of a locally stored image, and the image configuration table comprises version information of the image to be adjusted; and
   in case that the image configuration table comprises the identification of the image requested for loading and a version corresponding to the identification in the image configuration table is higher than a version corresponding to the identification in the local configuration information, the image to be adjusted corresponding to the identification of the image in the image configuration table and the link of the image at the server is downloaded from the server and loaded.

3. The image configuration method according to claim 2, further comprising:
   storing the image to be adjusted corresponding to the identification of the image in the image configuration table and the link of the image at the server into a buffer image path; and
   updating the version information in the local configuration information.

4. The image configuration method according to claim 3, wherein in the method of loading an image locally, the image is read from the buffer image path first, and in case that the image cannot be read from the buffer image path, the image is read from an original image path.

5. The image configuration method according to claim 1, further comprising:
   downloading a clearing configuration table, wherein the clearing configuration table comprises an identification of an image to be cleared in the terminal application; and
   deleting, from the local buffer image path, an image with the identification in the clearing configuration table.

6. The image configuration method according to claim 1, wherein the image configuration table is in a form of a key-value pair, and a key in the image configuration table is the identification of the image.

7. The image configuration method according to claim 1, wherein the image configuration table is downloaded in response to a start of the terminal application.

8. A non-transitory computer-readable storage medium having thereon stored a computer program which, when executed by a processor, implements the image configuration method of claim 3.

9. The non-transitory computer-readable storage medium according to claim 8, wherein:
   the terminal application has local configuration information comprising an identification and version information of a locally stored image, and the image configuration table comprises version information of the image to be adjusted; and
   in case that the image configuration table comprises the identification of the image requested for loading and a version corresponding to the identification in the image configuration table is higher than a version corresponding to the identification in the local configuration information, the image to be adjusted corresponding to the identification of the image in the image configuration table and the link of the image at the server is downloaded from the server and loaded.

10. The non-transitory computer-readable storage medium according to claim 9, the image configuration method further comprising:
    storing the image to be adjusted corresponding to the identification of the image in the image configuration table and the link of the image at the server into a buffer image path; and
    updating the version information in the local configuration information.

11. An image configuration method, comprising:
    downloading an image configuration table, wherein the image configuration table comprises an identification of an image to be adjusted in a terminal application and a link of the image to be adjusted at a server;
    in response to monitoring a request for loading an image, detecting whether there is an identification of the image requested for loading in the image configuration table; and
    in case that there is the identification of the image requested for loading in the image configuration table, downloading from the server and loading the image to be adjusted corresponding to the identification of the image in the image configuration table and the link of the image at the server, wherein:
    the terminal application has local configuration information comprising an identification and version information of a locally stored image, and the image configuration table comprises version information of the image to be adjusted;

in case that the image configuration table comprises the identification of the image requested for loading and a version corresponding to the identification in the image configuration table is higher than a version corresponding to the identification in the local configuration information, the image to be adjusted corresponding to the identification of the image in the image configuration table and the link of the image at the server is downloaded from the server and loaded; and the method further comprises: storing the image to be adjusted corresponding to the identification of the image in the image configuration table and the link of the image at the server into a buffer image path, and updating the version information in the local configuration information, wherein in the method of loading an image locally, the image is read from the buffer image path first, and in case that the image cannot be read from the buffer image path, the image is read from an original image path.

12. An image configuration device, comprising:
a memory; and
a processor coupled to the memory, which is configured to execute the image configuration method of claim 11.

13. A non-transitory computer-readable storage medium having thereon stored a computer program which, when executed by a processor, implements the image configuration method of claim 11.

14. An image configuration device, comprising:
a memory; and
a processor coupled to the memory, which is configured to execute an image configuration method for performing instructions comprising:
downloading an image configuration table, wherein the image configuration table comprises an identification of an image to be adjusted in a terminal application and a link of the image to be adjusted at a server;
in response to monitoring a request for loading an image, detecting whether there is an identification of the image requested for loading in the image configuration table; and
in case that there is the identification of the image requested for loading in the image configuration table, downloading from the server and loading the image to be adjusted corresponding to the identification of the image in the image configuration table and the link of the image at the server, wherein in case that there is the identification of the image requested for loading in the image configuration table, a method for loading an image locally in an image loading module of the terminal application is replaced with a method for loading an image from a server, wherein a parameter of the method for loading an image from a server comprises the identification of the image requested for loading and the link thereof at the server, and the method for loading an image locally in the image loading module is replaced with the method for loading an image from a server, through a runtime method swizzle mechanism.

15. An image configuration system, comprising:
a terminal application module comprising the image configuration device according to claim 14; and
a server module configured to send an image configuration table to the terminal application module.

16. The image configuration device according to claim 14, wherein:
the terminal application has local configuration information comprising an identification and version information of a locally stored image, and the image configuration table comprises version information of the image to be adjusted; and
in case that the image configuration table comprises the identification of the image requested for loading and a version corresponding to the identification in the image configuration table is higher than a version corresponding to the identification in the local configuration information, the image to be adjusted corresponding to the identification of the image in the image configuration table and the link of the image at the server is downloaded from the server and loaded.

17. The image configuration device according to claim 16, the image configuration method for performing instructions further comprising:
storing the image to be adjusted corresponding to the identification of the image in the image configuration table and the link of the image at the server into a buffer image path; and
updating the version information in the local configuration information.

\* \* \* \* \*